(12) United States Patent
Muraoka et al.

(10) Patent No.: US 11,920,990 B2
(45) Date of Patent: Mar. 5, 2024

(54) IN-VEHICLE TEMPERATURE DETECTION CIRCUIT

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ryunosuke Muraoka, Yokkaichi (JP); Yuuki Sugisawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 474 days.

(21) Appl. No.: 17/254,933

(22) PCT Filed: Jun. 5, 2019

(86) PCT No.: PCT/JP2019/022249
§ 371 (c)(1),
(2) Date: Dec. 22, 2020

(87) PCT Pub. No.: WO2020/003930
PCT Pub. Date: Jan. 2, 2020

(65) Prior Publication Data
US 2021/0364367 A1 Nov. 25, 2021

(30) Foreign Application Priority Data
Jun. 26, 2018 (JP) ................................. 2018-120792

(51) Int. Cl.
*G01K 7/20* (2006.01)
*G01K 13/00* (2021.01)
*G01K 7/16* (2006.01)

(52) U.S. Cl.
CPC ............... *G01K 7/20* (2013.01); *G01K 13/00* (2013.01); *G01K 7/16* (2013.01)

(58) Field of Classification Search
CPC .................................. G01K 7/20; G01K 13/00
(Continued)

(56) References Cited

U.S. PATENT DOCUMENTS 3,219,843 A * 11/1965 Follett ...................... G01K 7/01
327/512
5,111,691 A * 5/1992 John ...................... G01F 23/242
122/504
(Continued)

FOREIGN PATENT DOCUMENTS

JP      S44-6413 B1    3/1969
JP      S50-44558 U    5/1975
(Continued)

OTHER PUBLICATIONS

17254933_2023-04-03_JP_4089535_B2_H.pdf,May 2008.*
17254933_2023-04-03_JP_2011142728_A_H.pdf,Jul. 2011.*
17254933_2023-04-03_JP_3983439_B2_H.pdf,Sep. 2007.*
International Search Report, Application No. PCT/JP2019/022249, dated Aug. 20, 2019. ISA/Japan Patent Office.

*Primary Examiner* — Gail Kaplan Verbitsky
(74) *Attorney, Agent, or Firm* — Honigman LLP (57) ABSTRACT

An in-vehicle temperature detection circuit includes a temperature detecting unit including a plurality of individual detecting units, each having a first resistor and a temperature detecting element connected in series between a first conductive path to which a predetermined source voltage is applied and a reference conductive path. A plurality of bipolar transistors are connected to a corresponding individual detecting units. A second conductive path is electrically connected to each of emitters of the bipolar transistors. In each bipolar transistor, a base is electrically connected to a third conductive path between the first resistor and the (Continued)

temperature detecting element of the individual detecting unit corresponding to the bipolar transistor. A voltage reflecting the lowest voltage among the voltages applied to the third conductive paths in the plurality of individual detecting units is applied to the second conductive path.

5 Claims, 6 Drawing Sheets

(58) Field of Classification Search
USPC .................................. 374/170, 178, 183, 185
See application file for complete search history.

(56) References Cited

U.S. PATENT DOCUMENTS

| | | | |
|---|---|---|---|
| 8,922,152 | B2 | 12/2014 | Kawamura |
| 2015/0204730 | A1* | 7/2015 | Daitoku .................. H02M 1/32 |
| | | | 374/178 |
| 2019/0393780 | A1* | 12/2019 | Kozuma ............... H02M 3/156 |
| 2023/0062239 | A1* | 3/2023 | Zhou ....................... H05B 45/18 |

FOREIGN PATENT DOCUMENTS

| | | | | |
|---|---|---|---|---|
| JP | S57-50632 | A | 3/1982 | |
| JP | 3983439 | B2 * | 9/2007 | ............. B60L 50/51 |
| JP | 4089535 | B2 * | 5/2008 | |
| JP | 2011142728 | A * | 7/2011 | |

\* cited by examiner

IN-VEHICLE TEMPERATURE DETECTION CIRCUIT

CROSS-REFERENCE TO RELATED APPLICATIONS

This application is the U.S. national stage of PCT/JP2019/022249 filed on Jun. 5, 2019, which claims priority of Japanese Patent Application No. JP 2018-120792 filed on Jun. 26, 2018, the contents of which are incorporated herein.

TECHNICAL FIELD

The present disclosure relates to an in-vehicle temperature detection circuit.

BACKGROUND

A conventional technique is known in which the temperatures of a plurality of semiconductor devices installed in a vehicle or the like are detected individually and whether or not there is a temperature abnormality in the semiconductor devices is determined on the basis of the detected temperatures. For example, JP 2012-75234A discloses a technique in which a plurality of temperature detecting units which individually detect the temperatures of a plurality of switching elements (semiconductor devices) are provided, where a detection value is obtained from each of the temperature detecting units and whether or not there is an overheated state (a temperature abnormality) is determined on the basis of the obtained detection values.

However, with the technique described in JP 2012-75234A, a determining unit, which determines whether or not there is a temperature abnormality, must obtain the detection value from each of the temperature detecting units, and thus a separate input port must be provided for each of the temperature detection units. This is a problem in that the structure can easily become complicated.

Having been achieved in light of the above-described circumstances, an object of the present disclosure is to realize an in-vehicle temperature detection circuit that makes it possible to determine, using a simple configuration, whether or not a temperature abnormality has occurred for a plurality of semiconductor devices.

SUMMARY

An in-vehicle temperature detection circuit according to the present disclosure includes: a temperature detecting unit including a plurality of individual detecting units, each having a resistor and a temperature detecting element connected in series between a first conductive path to which a predetermined source voltage is applied and a reference conductive path; a plurality of bipolar transistors, each connected to a corresponding one of the plurality of individual detecting units; and a second conductive path electrically connected to each of emitters of the plurality of bipolar transistors. A base of each of the bipolar transistors is electrically connected to a third conductive path between the resistor and the temperature detecting element of the corresponding individual detecting unit. A voltage reflecting a highest voltage or a lowest voltage among voltages applied to the third conductive paths in the plurality of individual detecting units is applied to the second conductive path.

Advantageous Effects of Disclosure

In the in-vehicle temperature detection circuit according to the present disclosure, in each of the individual detecting units, a voltage based on a detected temperature from the temperature detecting element is applied to the third conductive path between the temperature detecting element and the resistor. The voltage applied to each of the third conductive paths is applied to the base of the bipolar transistor connected to each of the third conductive paths. A voltage reflecting a highest voltage or a lowest voltage among voltages applied to the third conductive paths in the plurality of individual detecting units is then applied to the second conductive path. In other words, a voltage based on the highest detected temperature or the lowest detected temperature among the detected temperatures detected by the plurality of temperature detecting elements is applied to the second conductive path. As such, whether or not there is a temperature abnormality in the plurality of semiconductor devices can be determined on the basis of the voltage of the second conductive path. Thus according to this temperature detection circuit, whether or not there is a temperature abnormality in the plurality of semiconductor devices can be determined with a simple configuration.

DETAILED DESCRIPTION OF PREFERRED EMBODIMENTS

In the in-vehicle temperature detection circuit according to the present disclosure, a plurality of bipolar transistors may all be PNP-type bipolar transistors with the collectors thereof electrically connected to a reference conductive path. Additionally, a voltage reflecting the lowest voltage among voltages applied to the third conductive paths in the plurality of individual detecting units may be applied to the second conductive path.

When the bipolar transistor is a PNP-type bipolar transistor, current can flow from the emitter side to the base side. Additionally, connecting the emitters of the bipolar transistors to the second conductive path brings those emitters to the same potential. Thus when current from the second conductive path (i.e., the emitter) flows to the base, among the bases of the bipolar transistors, to which the lowest voltage is applied, a voltage equivalent to that base voltage plus a predetermined voltage corresponding to the voltage drop across the base-emitter is applied to the second conductive path, and as a result, in the other bipolar transistors the base voltage is higher than a voltage equivalent to the emitter voltage minus the predetermined voltage. This prevents current from flowing across the bases-emitters of the other bipolar transistors. As a result, the voltage of the second conductive path stabilizes at a voltage equivalent to the lowest voltage of the bases of the bipolar transistors plus the predetermined voltage. Thus according to this configuration, a voltage reflecting the lowest voltage among the voltages applied to the bases of the bipolar transistors can be applied to the second conductive path.

When the bipolar transistors are constituted by PNP-type bipolar transistors, the following configuration may be employed. That is, a second resistor having one end electrically connected to the first conductive path and another end electrically connected to the second conductive path, a second bipolar transistor constituted by an NPN-type bipolar transistor and different from the plurality of bipolar transistors, and a third resistor having one end electrically connected to an emitter of the second bipolar transistor and another end electrically connected to the reference conductive path, may be included. A base of the second bipolar transistor may be electrically connected to the second conductive path, and a collector of the second bipolar transistor may be electrically connected to the first conductive path. A voltage reflecting a voltage of a 4th conductive path between the emitter of the second bipolar transistor and the one end of the third resistor may be output.

According to this configuration, the amount of a voltage rise across the bases-emitters of the bipolar transistors is canceled out across the base-emitter of the second bipolar transistor. As such, a voltage from before the rise across the bases-emitters of the bipolar transistors (i.e., the lowest voltage among the voltages applied to the bases of the bipolar transistors) is applied to the emitter of the second bipolar transistor. A voltage reflecting a voltage of the 4th conductive path between the emitter of the second bipolar transistor and the one end of the second resistor is then output. As such, if it is determined whether or not there is a temperature abnormality on the basis of this output voltage, it is no longer necessary to take into account a potential difference across the bases-emitters of the bipolar transistors, and the process of determining whether or not there is a temperature abnormality can be simplified.

In the in-vehicle temperature detection circuit according to the present disclosure, the plurality of bipolar transistors may all be NPN-type bipolar transistors with the collectors thereof electrically connected to the first conductive path. A plurality of second resistors may be provided so as to correspond to each of the plurality of bipolar transistors. One end of each of the second resistors may be electrically connected to an emitter of the bipolar transistor associated with that second resistor, and another end of each of the second resistors may be electrically connected to the reference conductive path. The second conductive path may be electrically connected to each of 4th conductive paths which are connected between the emitter of each of the bipolar transistors and the one end of each of the second resistors. Additionally, a voltage reflecting the highest voltage among voltages applied to the third conductive paths in the plurality of individual detecting units may be applied to the second conductive path.

When the bipolar transistor is an NPN-type bipolar transistor, current can flow from the base to the emitter. Additionally, connecting the emitters of the bipolar transistors to the second conductive path brings those emitters to the same potential. As such, when current flows from the base, among the bases of the bipolar transistors, to which the highest voltage is applied, to the second conductive path (i.e., the emitter), a voltage equivalent to that highest voltage minus a predetermined voltage (a voltage corresponding to a voltage drop across the base-emitter) is applied to the second conductive path, and thus the base voltages in the other bipolar transistors are lower than a voltage equivalent to the emitter voltage plus the predetermined voltage. As a result, current does not flow across the bases-emitters of the other bipolar transistors. Through this, the voltage of the second conductive path stabilizes at a voltage equivalent to the highest voltage of the bases of the bipolar transistors minus the predetermined voltage. Thus according to this configuration, a voltage reflecting the highest voltage among the voltages applied to the bases of the bipolar transistors can be applied to the second conductive path.

When the bipolar transistors are constituted by NPN-type bipolar transistors, the following configuration may be employed. That is, a second bipolar transistor constituted by a PNP-type bipolar transistor and different from the plurality of bipolar transistors, and a third resistor having one end electrically connected to an emitter of the second bipolar transistor and another end electrically connected to the first conductive path, may be included. A base of the second bipolar transistor may be electrically connected to the second conductive path, a collector of the second bipolar transistor may be electrically connected to the reference conductive path, and a voltage reflecting a voltage of a 5th conductive path between the emitter of the second bipolar transistor and the one end of the third resistor may be output.

According to this configuration, the amount of a voltage drop across the bases-emitters of the bipolar transistors is canceled out across the base-emitter of the second bipolar transistor. As such, a voltage from before the drop across the bases-emitters of the bipolar transistors (i.e., the highest voltage among the voltages applied to the bases of the bipolar transistors) is applied to the emitter of the second bipolar transistor. A voltage reflecting a voltage of the 5th conductive path between the emitter of the second bipolar transistor and the one end of the third resistor is then output. As such, if it is determined whether or not there is a temperature abnormality on the basis of this output voltage, it is no longer necessary to take into account a potential difference across the bases-emitters of the bipolar transistors, and the process of determining whether or not there is a temperature abnormality can be simplified.

First Embodiment

A first embodiment of the present disclosure will be described hereinafter.

Figure 1:
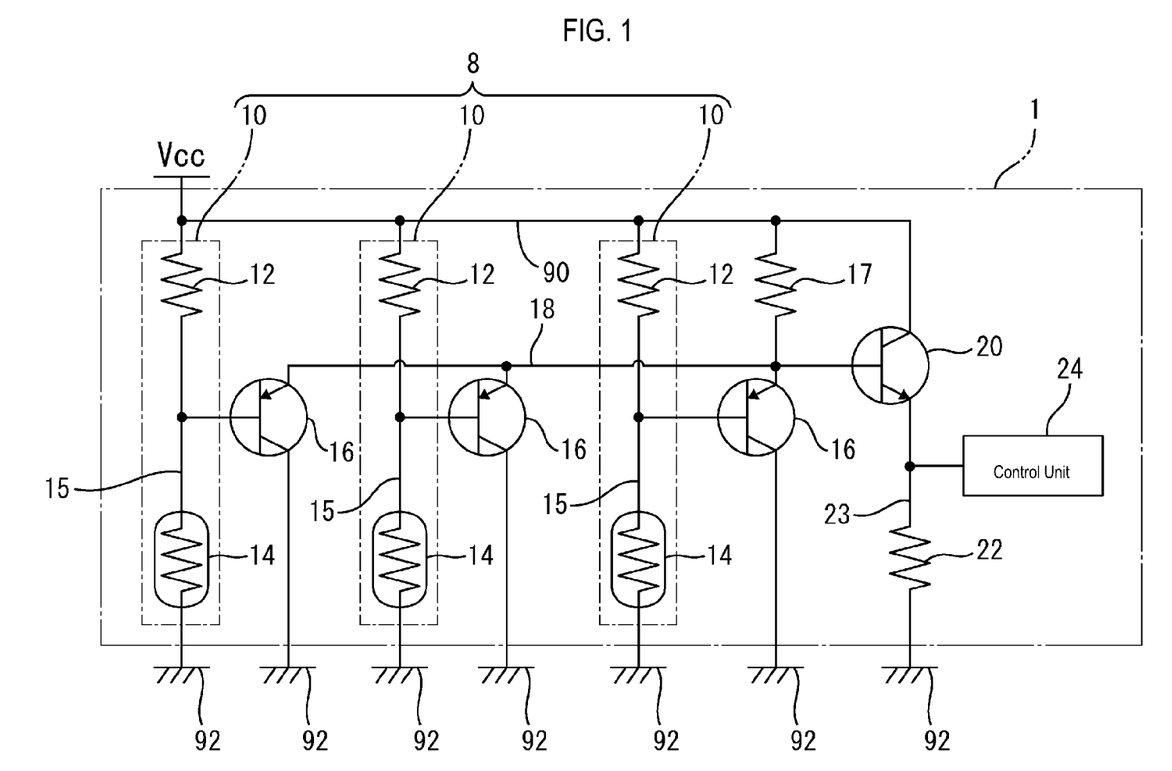
FIG. 1 is a circuit diagram illustrating an in-vehicle temperature detection circuit according to a first embodiment.

An in-vehicle temperature detection circuit 1 illustrated in FIG. 1 (also called a "temperature detection circuit 1" hereinafter) individually detects temperatures of a plurality of semiconductor devices installed in a vehicle and determines whether or not there is a temperature abnormality in the semiconductor devices on the basis of the detected temperatures.

The temperature detection circuit 1 mainly includes a temperature detecting unit 8, a plurality of bipolar transistors 16, a second conductive path 18, a bipolar transistor 20, a control unit 24, and the like.

The temperature detecting unit 8 has a plurality (three, in the example illustrated in FIGS. 1 and 2) of individual detecting units 10. Each individual detecting unit 10 is provided between a first conductive path 90, to which a voltage based on an output voltage (Vcc) of a power source unit is applied, and a reference conductive path 92. The voltage of the first conductive path 90, i.e., a potential difference between a potential of the first conductive path 90 and a potential of the reference conductive path 92, is kept at a predetermined source voltage (Vcc). The reference conductive path 92 is a conductive path having a potential which is kept at a predetermined ground potential (e.g., 0 V). Each individual detecting unit 10 has a configuration in which a first resistor 12 and a temperature detecting element 14 are connected in series. Specifically, one end of the first resistor 12 is connected to the first conductive path 90, and another end of the first resistor 12 is connected to one end of the temperature detecting element 14. Another end of the temperature detecting element 14 is connected to the reference conductive path 92. The temperature detecting element 14 is, for example, an NTC thermistor (Negative Temperature Coefficient Thermistor), and is configured as an element having a resistance which decreases as the detected temperature rises. Note that the first resistor 12 corresponds to an example of a resistor according to the present disclosure.

Each of the bipolar transistors 16 is configured as a PNP-type bipolar transistor, for example. The plurality of bipolar transistors 16 are connected so as to correspond to each of the plurality of individual detecting units 10. In each bipolar transistor 16, a base is electrically connected to a third conductive path 15 between the first resistor 12 and the temperature detecting element 14 of the individual detecting unit 10 corresponding to that bipolar transistor 16. Additionally, in each bipolar transistor 16, an emitter is electrically connected to the second conductive path 18, and a collector is electrically connected to the reference conductive path 92. Note that the bipolar transistor 16 corresponds to an example of a bipolar transistor according to the present disclosure.

The second conductive path 18 is electrically connected to the emitters of each of the plurality of bipolar transistors 16, bringing emitters which are connected to each other to the same potential. The second conductive path 18 is electrically connected to the first conductive path 90 via a second resistor 17. One end of the second resistor 17 is electrically connected to the second conductive path 18, and another end is electrically connected to the first conductive path 90.

The bipolar transistor 20 is configured as an NPN-type bipolar transistor, for example. A base of the bipolar transistor 20 is connected to the second conductive path 18, a collector is connected to the first conductive path 90, and an emitter is connected to the control unit 24 and one end of a third resistor 22. Another end of the third resistor 22 is connected to the reference conductive path 92. Note that the bipolar transistor 20 corresponds to an example of a second bipolar transistor according to the present disclosure.

The control unit 24 is a part which determines whether or not there is a temperature abnormality on the basis of the detected temperature from the temperature detecting element 14. The control unit 24 is configured including a microcomputer, for example, and includes a computation unit such as a CPU, memory such as ROM, RAM, or the like, an AD converter, and so on. The control unit 24 is electrically connected to a 4th conductive path 23 between the emitter of the bipolar transistor 20 and the third resistor 22. The control unit 24 detects a voltage reflecting a voltage applied to the 4th conductive path 23, detects a voltage applied to the emitter of the bipolar transistor 20, and determines whether or not there is a temperature abnormality on the basis of those detection values.

Actions of the temperature detection circuit 1 will be described next.

As described above, the temperature detecting element 14 is an NTC thermistor, and thus the voltage of the third conductive path 15 between the temperature detecting element 14 and the first resistor 12 drops as the detected temperature from the temperature detecting element 14 rises. The base of the bipolar transistor 16 is electrically connected to the third conductive path 15, and thus the voltage which drops as the detected temperature from the temperature detecting element 14 rises is applied to the base of the bipolar transistor 16.

Additionally, the bipolar transistor 16 is a PNP-type bipolar transistor, and thus current flows across the base-emitter from the emitter side to the base side. However, the emitters of the bipolar transistors 16 are electrically connected to each other via the second conductive path 18 and are therefore at the same potential. Thus when current flows from the emitter side to the base side in the bipolar transistor 16 having the lowest base voltage, the voltage of the second conductive path 18 and the emitters of the other bipolar transistors 16 are at a voltage equivalent to a predetermined voltage Vf equivalent to the voltage drop (e.g., 0.6 V) being added to that lowest base voltage. The base voltages of the other bipolar transistors 16 are higher than a voltage equivalent to the emitter voltage minus the predetermined voltage Vf, and thus no current flows across the base-emitter in the other bipolar transistors 16. As a result, the voltage of the second conductive path 18 stabilizes at a voltage equivalent to the lowest voltage of the voltages applied to the bases of the bipolar transistors 16 plus the predetermined voltage Vf (a voltage reflecting the lowest voltage of the voltages applied to the bases of the bipolar transistors 16).

Figure 2:
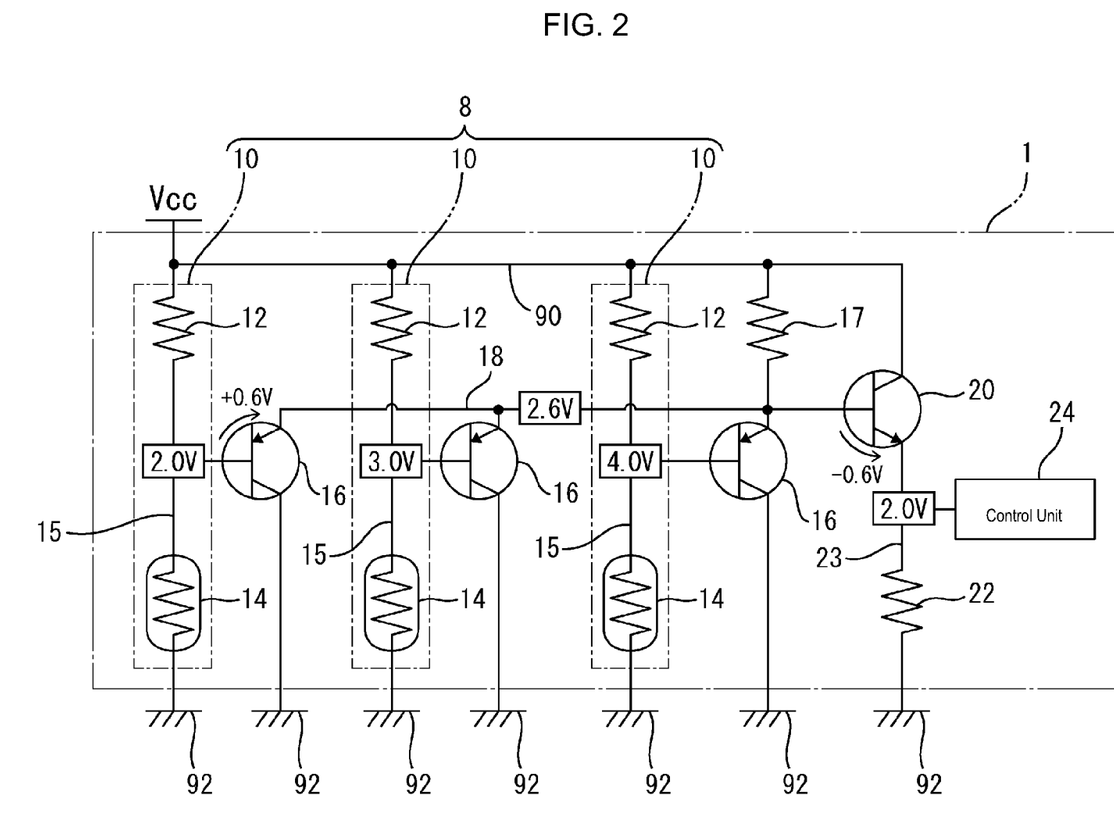
FIG. 2 is a diagram illustrating an example of actions of the in-vehicle temperature detection circuit according to the first embodiment.

For example, assume that voltages of 2 V, 3 V, and 4 V are applied to the bases of three of the bipolar transistors 16, as illustrated in FIG. 2. In this case, when current flows across the base-emitter in the bipolar transistor 16 in which the lowest voltage, i.e., 2 V, is applied to the base, 2.6 V, which is the base voltage of 2 V plus 0.6 V, will be applied to the second conductive path 18. At this time, the base voltages of the other bipolar transistors 16 are higher than 2.0 V, which is the emitter voltage (the voltage of the second conductive path 18) of 2.6 V minus 0.6 V, and thus no current flows across the base-emitter in the other bipolar transistors 16. As a result, the voltage of the second conductive path 18 stabilizes at 2.6 V.

Furthermore, the base of the bipolar transistor 20 is electrically connected to the second conductive path 18, and the bipolar transistor 20 is an NPN-type bipolar transistor. A voltage equivalent to the base voltage of the bipolar transistor 20 minus the predetermined voltage Vf is therefore applied to the emitter of the bipolar transistor 20 (the 4th conductive path 23). In the example illustrated in FIG. 2, 2.0 V, which is the voltage of 2.6 V applied to the second conductive path 18 minus 0.6 V, is applied to the emitter of the bipolar transistor 20 (the 4th conductive path 23). In other words, a voltage which cancels out the voltage drops across the bases-emitters of the bipolar transistors 16 is applied to the emitter of the bipolar transistor 20 (the 4th conductive path 23). A voltage reflecting the voltage of the 4th conductive path 23 is then output to the control unit 24.

The control unit 24 can detect the lowest base voltage among the base voltages of the bipolar transistors 16 (i.e., a voltage based on the highest detected temperature among the detected temperatures from the plurality of temperature detecting elements 14) by detecting the voltage of the 4th conductive path 23. Accordingly, the control unit 24 can determine whether or not there is a temperature abnormality (whether or not there is an overheated state) by determining, for example, whether or not the detected voltage is less than a predetermined threshold voltage.

An in-vehicle power system 100 including this temperature detection circuit 1 will be described next.

Figure 3:
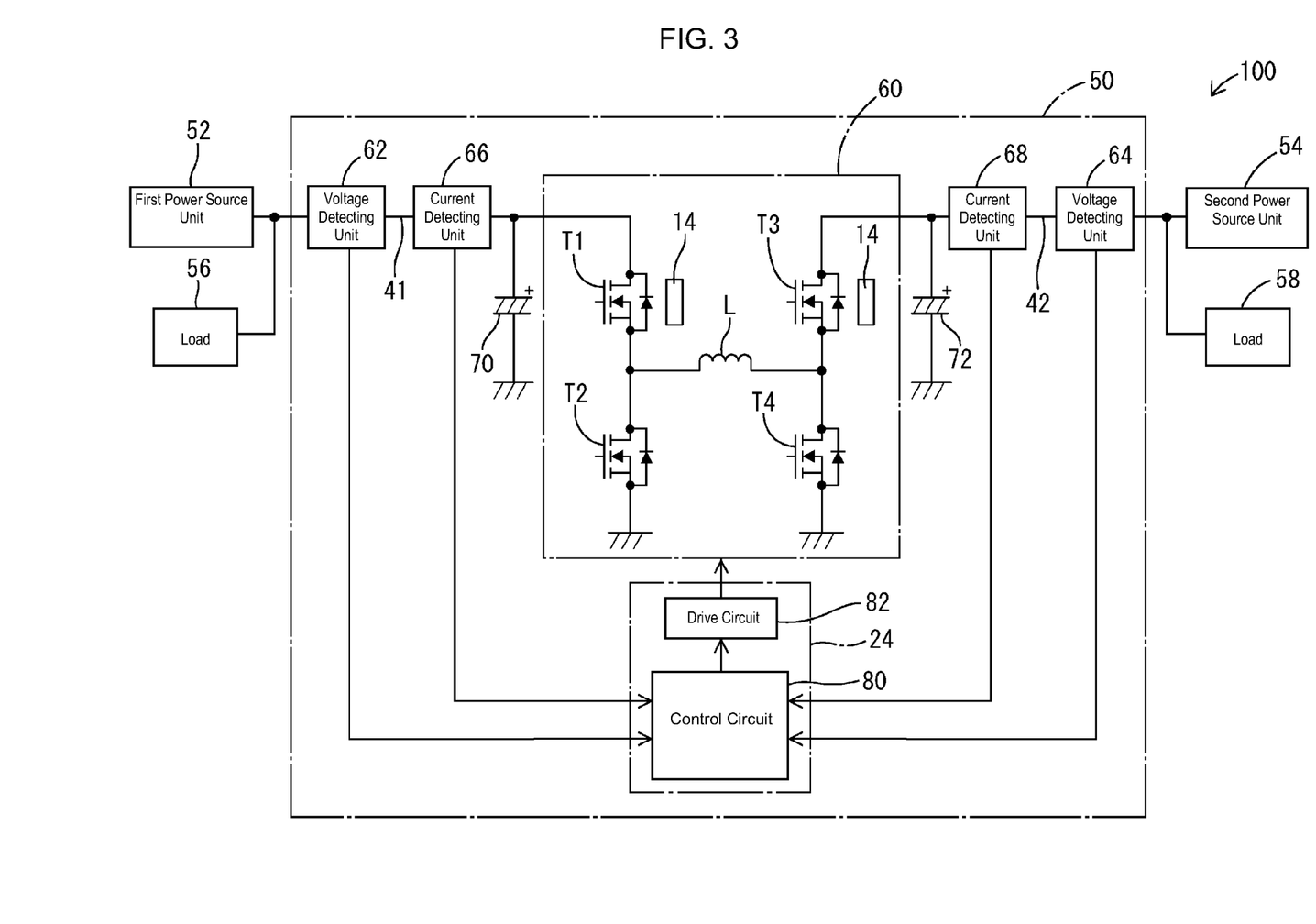
FIG. 3 is a diagram illustrating an example of the configuration of an in-vehicle power system including the in-vehicle temperature detection circuit according to the first embodiment.

As illustrated in FIG. 3, the in-vehicle power system 100 includes a voltage conversion device 50, a first power source unit 52, and a second power source unit 54, and is configured as a system capable of supplying power to in-vehicle loads such as loads 56 and 58.

The voltage conversion device 50 is configured, for example, as an in-vehicle step-up/step-down DC-DC converter, and includes a voltage conversion unit 60. The voltage conversion unit 60 is provided between a primary-side conductive path 41, to which a high-potential side terminal of the first power source unit 52 and the load 56 are connected, and a secondary-side conductive path 42, to which a high-potential side terminal of the second power source unit 54 and the load 58 are connected.

The voltage conversion unit 60 includes switching elements T1, T2, T3, and T4 arranged in an H-bridge structure and an inductor L, and functions as what is known as a bidirectional DC-DC converter. In other words, the voltage conversion unit 60 has a function of stepping up or stepping down the voltage applied to the primary-side conductive path 41 and outputting that voltage to the secondary-side conductive path 42, and a function of stepping up or stepping down the voltage applied to the secondary-side conductive path 42 and outputting that voltage to the primary-side conductive path 41. Furthermore, a capacitor 70 is connected to the primary-side conductive path 41, and a capacitor 72 is connected to the secondary-side conductive path 42.

The voltage conversion device 50 includes voltage detecting units 62 and 64 that detect the voltage of the primary-side conductive path 41 and the voltage of the secondary-side conductive path 42, respectively, and current detecting units 66 and 68 that detect current in the primary-side conductive path 41 and current in the secondary-side conductive path 42, respectively. The detection values from the voltage detecting units 62 and 64 and the detection values from the current detecting units 66 and 68 are output to the control unit 24. The control unit 24 includes a control circuit 80 (e.g., a microcomputer) and a drive circuit 82, and can, by turning the switching elements T1, T2, T3, and T4 on and off on the basis of the detection values from the voltage detecting units 62 and 64 or the detection values from the current detecting units 66 and 68, drive the voltage conversion unit 60 to perform step-up operations or step-down operations.

In this in-vehicle power system 100, when the step-up operations or the step-down operations are performed, the switching elements T1, T2, T3, and T4 are turned on and off at high speeds, which causes the switching elements T1, T2, T3, and T4 to produce heat. It is therefore necessary to monitor the temperature around the switching elements T1, T2, T3, and T4 to avoid an overheated state. As such, in the example illustrated in FIG. 3, the temperature detecting elements 14 are disposed near the switching elements T1, T2, T3, and T4. In the example illustrated in FIG. 3, the temperature detecting elements 14 are provided only for some (two, in FIG. 3) of the four switching elements T1, T2, T3, and T4. Specifically, a temperature detecting element 14 is provided on both the primary-side conductive path 41 side and the secondary-side conductive path 42 side of the inductor L. When the temperature detecting elements 14 are provided only for some of the switching elements, it is preferable that the temperature detecting elements 14 be provided for switching elements which tend to produce heat, e.g., for switching elements which tend to produce heat as a result of actual operations.

As described thus far, according to the temperature detection circuit 1, in each individual detecting unit 10, a voltage based on the detected temperature from the NTC thermistor (the temperature detecting element 14) is applied to the third conductive path 15 between the temperature detecting element 14 and the first resistor 12. The voltage applied to each third conductive path 15 is then applied to the base of the PNP-type bipolar transistor (bipolar transistor 16) connected to that third conductive path 15. A voltage reflecting the lowest voltage among the voltages applied to the third conductive paths 15 in the plurality of individual detecting units 10 (i.e., the voltage based on the highest detected temperature) is then applied to the second conductive path 18. Accordingly, the control unit 24 can determine whether or not the plurality of switching elements are in an overheated state (have a temperature abnormality) on the basis of the voltage in which the voltage of the second conductive path 18 is reflected. Thus according to the temperature detection circuit 1, whether or not there is a temperature abnormality in the plurality of switching elements can be determined with a simple configuration.

Additionally, a voltage reflecting the voltage of the 4th conductive path 23 between the emitter of the bipolar transistor 20 and the one end of the third resistor 22 is output to the control unit 24. In other words, the control unit 24 can detect a voltage in which a voltage, in which the amount of the rise caused by the voltage drops across the bases-emitters of the bipolar transistors 16 has been canceled out by the bipolar transistor 20, is reflected. It is therefore unnecessary for the control unit 24 to take into account the influence of the voltage drops across the bases-emitters of the bipolar transistors 16, which makes it possible to simplify the process of determining whether or not there is an overheated state.

Second Embodiment

In the first embodiment, the bipolar transistor is a PNP-type bipolar transistor. However, in the second embodiment, the bipolar transistor is an NPN-type bipolar transistor. In the following descriptions and referenced drawings, parts that constitute the same configurations as those in the temperature detection circuit 1 according to the first embodiment will be given the same reference signs as in the temperature detection circuit 1 according to the first embodiment, and will not be described in detail.

Figure 4:
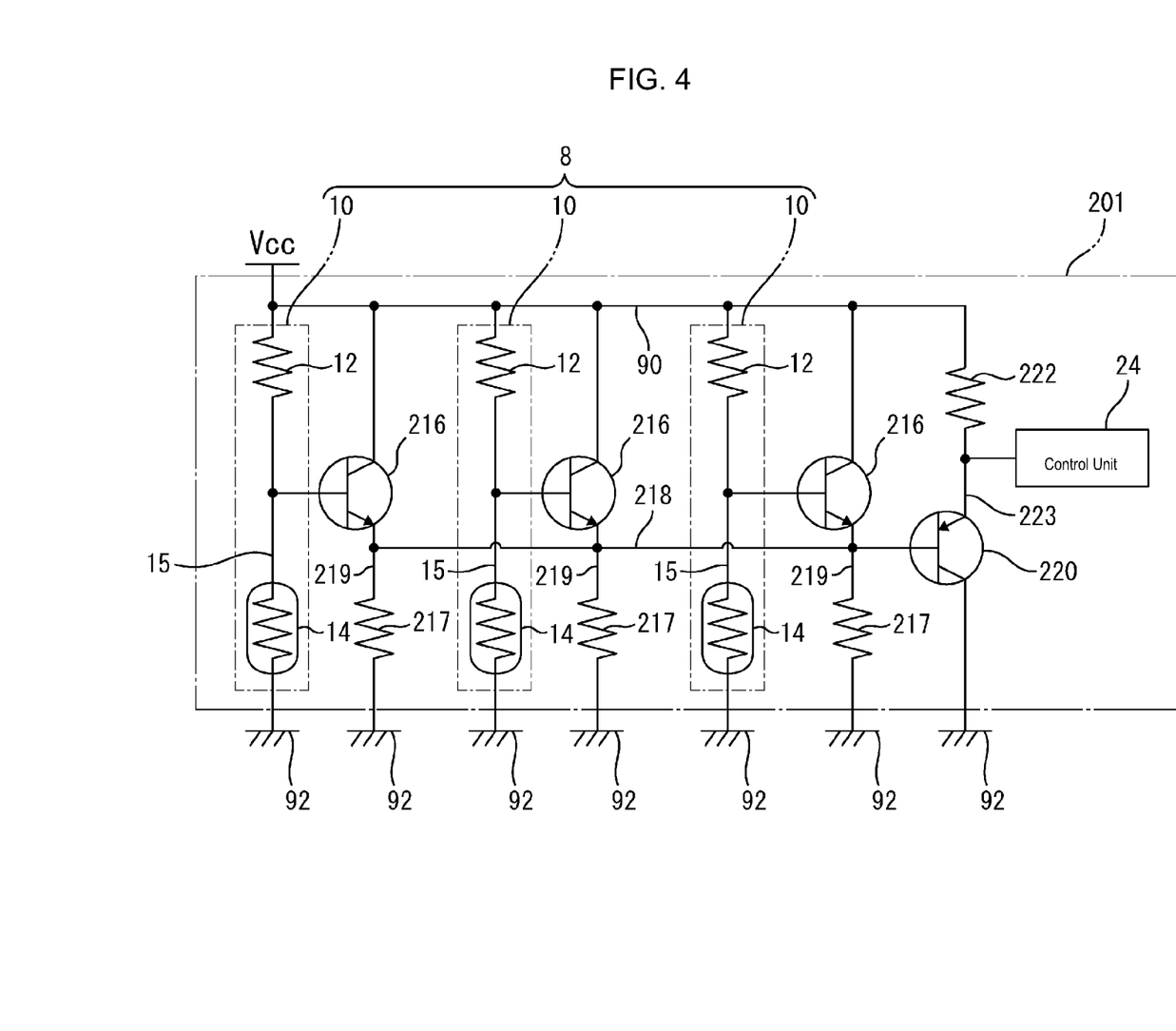
FIG. 4 is a circuit diagram illustrating an in-vehicle temperature detection circuit according to a second embodiment.

As illustrated in FIG. 4, a temperature detection circuit 201 according to the second embodiment mainly includes the temperature detecting unit 8, a plurality of bipolar transistors 216, a second conductive path 218, a bipolar transistor 220, the control unit 24, and the like.

The temperature detecting unit 8 has a plurality (three, in the example illustrated in FIGS. 4 and 5) of the individual detecting units 10. Each individual detecting unit 10 is provided between the first conductive path 90 and the reference conductive path 92. Each individual detecting unit 10 has a configuration in which a first resistor 12 and a temperature detecting element 14 are connected in series.

The bipolar transistor 216 is configured as an NPN-type bipolar transistor, for example. The plurality of bipolar transistors 216 are connected so as to correspond to each of the plurality of individual detecting units 10. In each bipolar transistor 216, a base is electrically connected to the third conductive path 15 of the individual detecting unit 10 corresponding to that bipolar transistor 216. Each collector of each bipolar transistor 216 is electrically connected to the first conductive path 90. A plurality of second resistors 217 are provided so as to correspond to each of the plurality of bipolar transistors 216. One end of the second resistor 217 is electrically connected to an emitter of the bipolar transistor 216 associated with that second resistor 217, and another end is electrically connected to the reference conductive path 92. The second conductive path 218 is electrically connected to each of 4th conductive paths 219, which are connected between the emitter of each bipolar transistor 216 and the one end of each second resistor 217. Note that the bipolar transistor 216 corresponds to an example of a bipolar transistor according to the present disclosure.

The bipolar transistor 220 is configured as a PNP-type bipolar transistor. In the bipolar transistor 220, a base is electrically connected to the second conductive path 218, a collector is electrically connected to the reference conductive path 92, and an emitter is connected to one end of a third resistor 222. Another end of the third resistor 222 is electrically connected to the first conductive path 90. The control unit 24 is electrically connected to a 5th conductive path 223 between the emitter of the bipolar transistor 220 and the third resistor 222. Note that the bipolar transistor 220 corresponds to an example of a second bipolar transistor according to the present disclosure.

Actions of the temperature detection circuit 201 will be described next.

In the temperature detection circuit 201, the bipolar transistor 216 is an NPN-type bipolar transistor, and thus current flows across the base-emitter from the base side to the emitter side. However, the emitters of the bipolar transistors 216 are connected to each other via the second conductive path 218 and are therefore at the same potential. Thus when current flows from the base side to the emitter side in the bipolar transistor 216 having the highest base voltage, the voltage of the second conductive path 218 and the emitters of the other bipolar transistors 216 are at a voltage equivalent to a predetermined voltage Vf equivalent to the voltage drop (e.g., 0.6 V) being added to that highest base voltage. Furthermore, because the base voltages of the other bipolar transistors 216 are lower than a voltage equivalent to the emitter voltage plus the predetermined voltage Vf, no current flows across the bases-emitters of the other bipolar transistors 216. As a result, the voltage of the second conductive path 218 stabilizes at a voltage equivalent to the highest voltage of the voltages applied to the bases of the bipolar transistors 216 minus the predetermined voltage Vf (a voltage reflecting the highest voltage of the voltages applied to the bases of the bipolar transistors 216).

Figure 5:
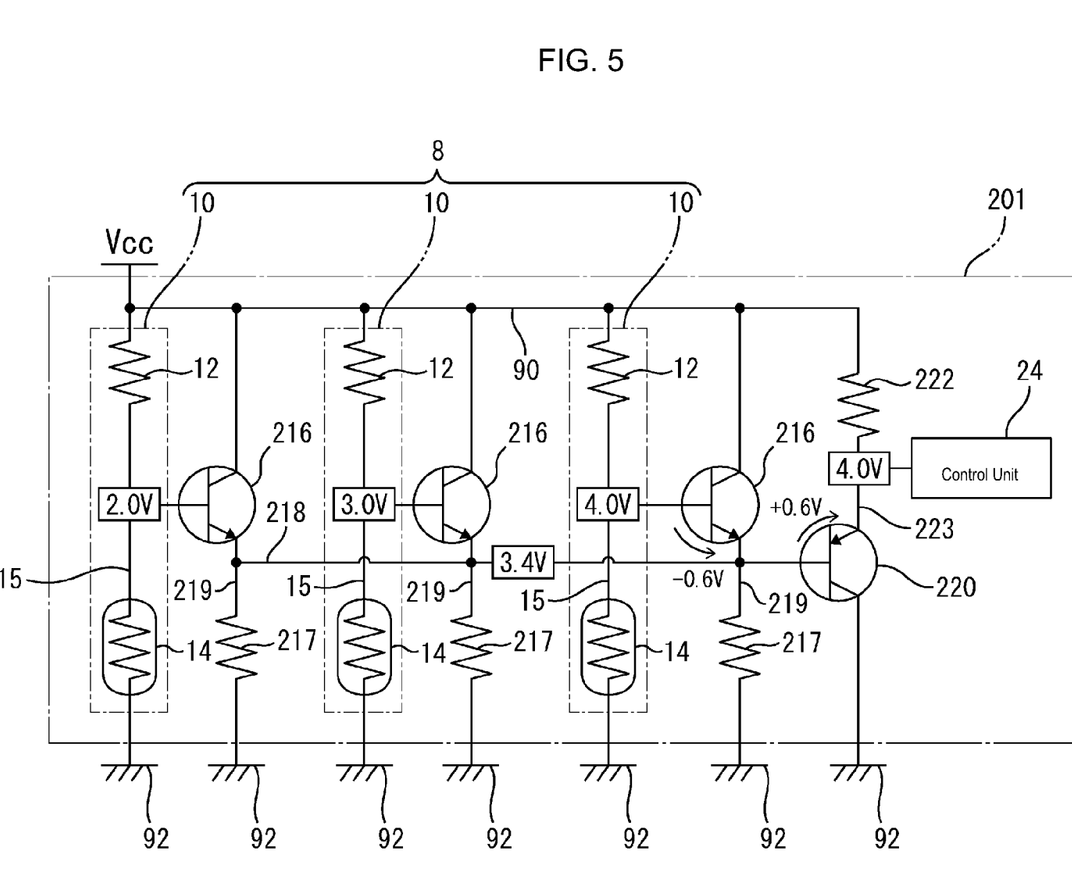
FIG. 5 is a diagram illustrating an example of actions of the in-vehicle temperature detection circuit according to the second embodiment.

For example, assume that voltages of 2 V, 3 V, and 4 V are applied to the bases of three of the bipolar transistors 216, as illustrated in FIG. 5. In this case, when current flows across the base-emitter in the bipolar transistor 216 in which the highest voltage, i.e., 4 V, is applied to the base, 3.4 V, which is the base voltage of 4 V minus 0.6 V, will be applied to the second conductive path 218. At this time, the base voltages of the other bipolar transistors 216 are lower than 4 V, which is the emitter voltage of 3.4 V plus the 0.6 V, and thus no current flows across the bases-emitters of the other bipolar transistors 216. As a result, the voltage of the second conductive path 218 stabilizes at 3.4 V.

Furthermore, the base of the bipolar transistor 220 is connected to the second conductive path 218, and the bipolar transistor 220 is a PNP-type bipolar transistor. As such, a voltage equivalent to the base voltage of the bipolar transistor 220 plus the predetermined voltage Vf is applied to the emitter of the bipolar transistor 220. In the example illustrated in FIG. 5, 4 V, which is the voltage of 3.4 V applied to the second conductive path 218 plus 0.6 V, is applied to the emitter of the bipolar transistor 220. In other words, a voltage which cancels out the voltage drops across the bases-emitters of the bipolar transistors 216 is applied to the emitter of the bipolar transistor 220.

The control unit 24 can detect the highest base voltage among the base voltages of the bipolar transistors 216 (i.e., a voltage based on the lowest detected temperature among the detected temperatures from the plurality of temperature detecting elements 14) by detecting the voltage applied to the emitter of the bipolar transistor 220. Accordingly, the control unit 24 can determine whether or not there is a temperature abnormality (whether or not there is a low-temperature state) by determining, for example, whether or not the detected voltage is greater than or equal to a predetermined threshold voltage.

Third Embodiment

In the first embodiment, the temperature detecting element is an NTC thermistor. However, in the third embodiment, the temperature detecting element is a PTC thermistor (Positive Temperature Coefficient Thermistor).

Figure 6:
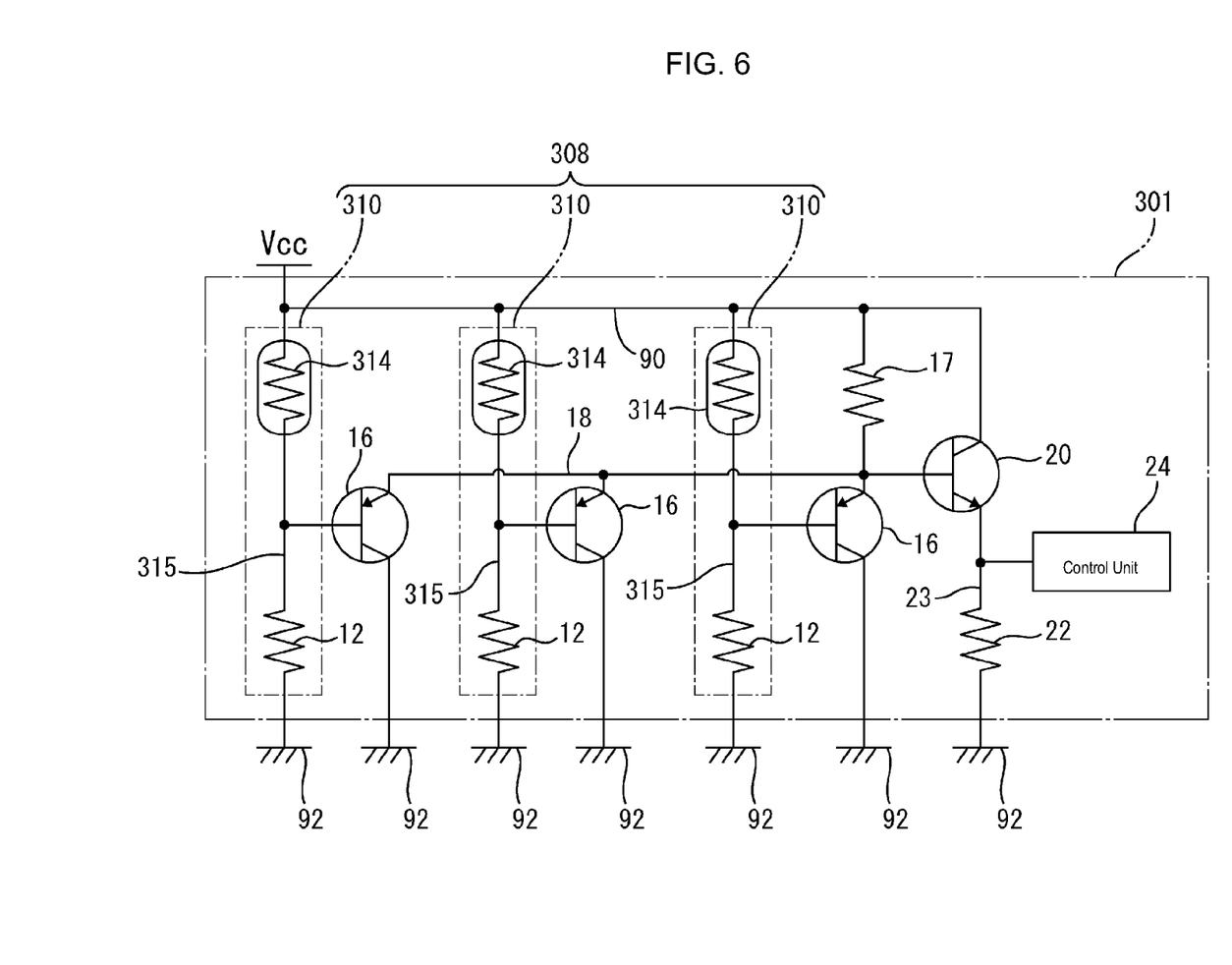
FIG. 6 is a circuit diagram illustrating an in-vehicle temperature detection circuit according to a third embodiment.

As illustrated in FIG. 6, a temperature detection circuit 301 according to the third embodiment includes a temperature detecting unit 308 instead of the temperature detecting unit 8 according to the first embodiment. The temperature detecting unit 308 has a plurality (three, in the example illustrated in FIG. 6) of individual detecting units 310. Each individual detecting unit 310 is provided between the first conductive path 90 and the reference conductive path 92. Each individual detecting unit 310 has a configuration in which the first resistor 12 and a temperature detecting element 314 are connected in series.

The temperature detecting element 314 is configured as, for example, a PTC thermistor (an element having a resistance which increases as the detected temperature rises). The order of the first resistor 12 and the temperature detecting element 314 is the reverse of the order of the first resistor 12 and the temperature detecting element 14 in the first embodiment. In other words, one end of the temperature detecting element 314 is electrically connected to the first conductive path 90, and another end of the temperature detecting element 314 is electrically connected to one end of the first resistor 12. Another end of the first resistor 12 is electrically connected to the reference conductive path 92.

Thus in the third embodiment, while the temperature detecting element has been changed from an NTC thermistor to a PTC thermistor, the order with respect to the first resistor 12 has been changed as well, and thus the voltage applied to the third conductive path 315 between the temperature detecting element 314 and the first resistor 12 drops as the detected temperature from the temperature detecting element 314 rises, in the same manner as in the first embodiment. Thus like in the first embodiment, a voltage based on the highest detected temperature is applied to the second conductive path 18, and a voltage in which the amount of the voltage rise across the base-emitter of the bipolar transistor 16 has been cancelled out is applied to the emitter of the bipolar transistor 20.

Other Embodiments

The present disclosure is not limited to the embodiments described above with reference to the drawings, and embodiments such as the following, for example, also fall within the technical scope of the present disclosure.

In the first to third embodiments, a voltage which is lower as the detected temperature from the plurality of temperature detecting elements 14 rises is applied to the bases of the bipolar transistors 16 and 216. However, a voltage which is higher as the detected temperature from the plurality of temperature detecting elements 14 rises may be applied to the bases of the bipolar transistors 16 and 216. For example, in the temperature detection circuit 1 according to the first embodiment, the arrangement of the first resistor 12 and the temperature detecting element 14 may be switched while leaving the temperature detecting element 14 as an NTC thermistor. Additionally, in the temperature detection circuit 1 according to the first embodiment, the temperature detecting element 14 may be implemented as a PTC thermistor, without switching the arrangement of the first resistor 12 and the temperature detecting element 14.

In the first to third embodiments, the control unit 24 detects a voltage applied to the emitters of the bipolar transistor 20 and 220, and determines whether or not there is a temperature abnormality on the basis of those detection values. However, the control unit 24 may detect a voltage applied to the second conductive paths 18 and 218 and determine whether or not there is a temperature abnormality on the basis of those detection values. In this case, the bipolar transistors 20 and 220 are not needed, and thus the number of components can be reduced.

In the first to third embodiments, there are three of the individual detecting units 10 and 310, but this number may be two, or may be four or more.

The invention claimed is:

1. An in-vehicle temperature detection circuit, comprising:
    a temperature detecting unit including a plurality of individual detecting units, each having a resistor and a temperature detecting element connected in series with each other, the resistor and the temperature detecting element interposed between a first conductive path and a reference conductive path, the reference conductive path being a ground, a predetermined source voltage is applied to the first conductive path, wherein each of the plurality of individual detecting units are interposed between the predetermined source voltage and the ground and each of the plurality of individual detecting units are connected to each other in series along the first conductive path;
    a plurality of first bipolar transistors, each of the first bipolar transistors including a first emitter, a first collector and a first base, each of the plurality of first bipolar transistors connected to a corresponding one of the plurality of individual detecting units; and
    a second conductive path electrically connected to the first conductive path and to each of the first emitter of the plurality of first bipolar transistors,
    wherein the first base of each of the plurality of first bipolar transistors is electrically connected to a third conductive path of the corresponding individual detecting unit, the third conductive path connecting the resistor to the temperature detecting element; and
    a voltage reflecting a highest voltage or a lowest voltage among voltages applied to the third conductive paths in the plurality of individual detecting units is applied to the second conductive path.

2. The in-vehicle temperature detection circuit according to claim 1,
    wherein each of the plurality of bipolar transistors is a PNP-type bipolar transistor in which the first collector is electrically connected to the reference conductive path; and
    a voltage reflecting the lowest voltage among the voltages applied to the third conductive paths in the plurality of individual detecting units is applied to the second conductive path.

3. The in-vehicle temperature detection circuit according to claim 2, comprising:
    a second resistor having one end electrically connected to the first conductive path and another end electrically connected to the second conductive path;
    a second bipolar transistor, the second bipolar transistor being an NPN-type bipolar transistor; and
    a third resistor having one end electrically connected to an emitter of the second bipolar transistor and another end electrically connected to the reference conductive path,
    wherein a base of the second bipolar transistor is electrically connected to the second conductive path, and a collector of the second bipolar transistor is electrically connected to the first conductive path, and
    a voltage reflecting a voltage of a 4th conductive path between the emitter of the second bipolar transistor and the one end of the third resistor is output.

4. The in-vehicle temperature detection circuit according to claim 1,
    wherein each of the plurality of first bipolar transistors is an NPN-type bipolar transistor in which the first collector is electrically connected to the first conductive path;
    a plurality of second resistors are provided so as to correspond to each of the plurality of first bipolar transistors;
    one end of each of the second resistors is electrically connected to the first emitter of the first bipolar transistor associated with that second resistor, and another end of each of the second resistors is electrically connected to the reference conductive path;
    the second conductive path is electrically connected to each of 4th conductive paths which are connected between the first emitter of each of the first bipolar transistors and the one end of each of the second resistors; and
    a voltage reflecting the highest voltage among the voltages applied to the third conductive paths in the plurality of individual detecting units is applied to the second conductive path.

5. The in-vehicle temperature detection circuit according to claim 4, comprising:
    a second bipolar transistor that is a PNP-type bipolar transistor; and
    a third resistor having one end electrically connected to an emitter of the second bipolar transistor and another end electrically connected to the first conductive path,
    wherein a base of the second bipolar transistor is electrically connected to the second conductive path, and a collector of the second bipolar transistor is electrically connected to the reference conductive path; and
    a voltage reflecting a voltage of a 5th conductive path between the emitter of the second bipolar transistor and the one end of the third resistor is output.

* * * * *